United States Patent [19]
Kobayashi et al.

[11] 4,387,311
[45] Jun. 7, 1983

[54] UNINFLAMMABLE DYNAMOELECTRIC MACHINE HAVING COIL WINDINGS AND CORE ENCAPSULATED WITH UNSATURATED POLYESTER RESIN-FILLER COMPOSITION

[75] Inventors: Tsuguo Kobayashi, Mito; Tetsuo Ishikawa; Kenichi Hironaka, both of Hitachi; Hideo Umetsu, Tokaimura; Masatsugu Ogata, Hitachi; Hitoshi Yokono, Katsuta, all of Japan

[73] Assignee: Hitachi, Ltd., Tokyo, Japan

[21] Appl. No.: 247,269

[22] Filed: Mar. 25, 1981

Related U.S. Application Data

[63] Continuation of Ser. No. 940,091, Sep. 6, 1978, abandoned.

[30] Foreign Application Priority Data

Sep. 9, 1977 [JP] Japan ................................ 52-107742

[51] Int. Cl.$^3$ ...................... H02K 1/04; C08L 67/06; C08K 7/14; B32B 27/36
[52] U.S. Cl. ...................................... 310/43; 428/482; 428/921; 523/220; 524/513; 524/514; 524/786; 524/788
[58] Field of Search ............. 260/40 R, 42.8; 310/43, 310/45; 428/920, 921, 268, 480, 482

[56] References Cited

U.S. PATENT DOCUMENTS 4,128,527 12/1978 Kinjo et al. .................... 260/42.18

OTHER PUBLICATIONS

Hackh's Chemical Dictionary, 4th Edition, Julius Grant, McGraw-Hill Book Co., New York, N.Y., 1969, p. 31.

Primary Examiner—Paul Lieberman
Assistant Examiner—Robert E. L. Sellers
Attorney, Agent, or Firm—Antonelli, Terry & Wands

[57] ABSTRACT

In a dynamoelectric machine having a stator assembly of coil windings and a core, a heat-dissipating, uninflammable, electro-insulative housing encapsulates the coil windings and the core. The housing is made of a cured molded article or material formed of a resin-filler composition which comprises a liquid unsaturated polyester resin, a finely divided calcium carbonate powder, an inorganic mineral particulate having a particle size larger than that of the calcium carbonate powder, a chopped glass fiber and an aluminum hydroxide powder, wherein the ratio by weight of the calcium carbonate to the mineral particulate is 0.3 to 4, the ratio of the weight of glass fiber to the total weight of the composition is 0.05 to 0.25, the ratio of the weight of the polyester resin to the total weight of the composition is 0.1 to 0.4, the weight ratio of the calcium carbonate powder, the mineral particulate and the glass fiber to the total weight of the composition is 0.15 to 0.80, and the weight ratio of the aluminum hydroxide powder to the total weight of the composition is 0.1 to 0.6.

14 Claims, 5 Drawing Figures

UNINFLAMMABLE DYNAMOELECTRIC MACHINE HAVING COIL WINDINGS AND CORE ENCAPSULATED WITH UNSATURATED POLYESTER RESIN-FILLER COMPOSITION

This is a continuation of application Ser. No. 940,091, filed Sept. 6, 1978 now abandoned.

BACKGROUND OF THE INVENTION

1. Field of the Invention

The present invention relates to improvements in dynamoelectric machines having an uninflammable, electro-insulative, heat-dissipating housing in which coil windings and a core of a stator are tightly and voidlessly molded, and more particularly, to dynamoelectric machines having improved electric and mechanical properties that are manufactured by the use of a resin-filler system with molding characteristics optimized for stators of dynamoelectric machines.

2. Description of the Prior Art

U.S. Pat. No. 3,758,799, titled "DYNAMOELECTRIC MACHINE", to Dochterman et al, discloses dynamoelectric machines having a housing which encapsulates stator coil windings and a core with a resin-filler composition system. The housing disclosed in the patent does not include a metal case or shell and does include a substantially rigid structure member of an interstitial mass of inert particulate material.

Adhesive material such as an unsaturated polyester resin occupies interstices of the mass and bonds inert particulates together and to remainder of the structure.

This patent discloses several kinds of resin-filler composition systems, which are most important for the dynamoelectric machines of this type. From the practical point of view, the dynamoelectric machines are manufactured by injection or transfer molding; therefore, characteristics of the resin-filler composition system must be fully investigated and optimized, otherwise the dynamoelectric machines of this type cannot be produced on an industrial basis. For example, in small-sized motors or generators, coil windings made of fine wires are easily deformed during molding operation of the housing. Furthermore, in the motors or generators, slots formed in the inner periphery of a stator core are very narrow in width. If the resin-filler composition system has unsatisfactory flow properties, filling of the slots is insufficient. If the resin-filler composition system has a viscosity which is too small, resin separation will be large so that electrical properties of the stators of the dynamoelectric machines will be unsatisfactory.

There are still many other factors to be considered when stators of dynamoelectric machines disclosed in the U.S. patent are manufactured by injection or transfer molding.

There have been proposed a variety of resin-filler composition systems such as disclosed in U.S. Pat. No. 3,658,750, titled "THERMOSETTING RESIN COMPOSITION AND ELECTRICAL APPLIANCES USING THE SAME" to Tsukui et al, and U.S. Pat. No. 3,763,080, titled "PRESSURE MOLDED ARTICLES AND MOLDABLE COMPOSITION", to Deuter. Tsukui et al disclose a resin-filler composition usable for transfer molding of rotor coils of motors, and of transformers, which comprises a thermosetting resin, a coarse powder filler having a particle size larger than 100 $\mu$m and a fine powder filler having a particle size smaller than 60 $\mu$m, an amount of the fillers being 40 to 80 percent by volume of the total volume. Tsukui et al also disclose addition of finely divided lead tetraoxide powder as a precipitation inhibitor. Investigations by the present inventors have shown that the resin-filler compositions disclosed in the Tsukui et al patent are not useful as a molding material for stators of small-sized dynamoelectric machines. The cured product of the compositions exhibited a small crack resistance and unsatisfactory flow properties when applied to stators of dynamoelectric machines.

Deuter discloses a moldable composition comprising a thermosetting resin, a particulate material having a particle size distribution such that about 95% to 100% passes a 30 mesh sieve, at least 50% passes a 40 mesh sieve and is retained on a 100 mesh sieve, and no more than a minor amount passes a 200 mesh sieve and a separation inhibitor. Deuter exemplifies as a separation inhibitor colloidal silica, aerosol Grade 200, powdered silica, powdered asbestos, extremely short glass fibers and powdered mineral wollastonite. Further, there are exemplified as a particulate material chromium ore, slate, chalk, zirconia, alumina, calcium carbonate, mica, beryllium oxide, magnesium oxide and sand. The particulate material should have a much larger particle size than the separation inhibitor. In other words, the particle size of the former is 40 to 100 mesh (more than 149 $\mu$m in diameter), while the particle size of the latter is about 0.012 $\mu$m in case of colloidal silica (Cab-O-Sil M-5).

According to the description of the Deuter patent, suitable separation inhibitors should have a particle size of 325 mesh or less (44 $\mu$m or less in terms of particle size). Investigations of the moldable composition disclosed in this patent showed that its molding characteristics were unsatisfactory and electric properties of the resulting housing of the stator were not good.

U.S. Pat. No. 3,562,201, titled "UNSATURATED POLYESTER RESIN/MONOMER MOULDING COMPOSITIONS", to Crowe et al, discloses a composition which comprises an unsaturated polyester resin, a primary absorbent filler and a secondary filler. The primary absorbent filler includes diatomite, bentonite, etc. and is able to absorb liquid from the polyester/monomer system to thereby improve flow properties of the composition. The secondary fillers, though not essential for the composition, include such as glass fiber, minerals, e.g. finely divided calcium carbonate, clay, alumina trihydrate, dolomite, asbestos, or synthetic fibers. Crowe et al do not describe the particle size of the primary absorbent filler, but the present inventors believe the particle size thereof is very small because "Dicalite" used as the primary absorbent filler has an extremely small particle size. However, this composition has been found to be improper when applied to the injection or transfer molding of stators of dynamoelectric machines, especially for small sized dynamoelectric machines, because it showed unsatisfactory molding characteristics including flow properties.

In relation to the present application, there is the co-pending application Ser. No. 787,098 filed Apr. 13, 1977, now U.S. Pat. No. 4,128,527, and assigned to the assignee of the present application, titled "DYNAMOELECTRIC MACHINE HAVING COIL WINDINGS AND CORE ENCAPSULATED WITH RESIN-FILLER COMPOSITION". As suggested in said application, with an increase of the capacity of a dynamoelectric machine, there becomes necessary to use a fire retardant or self-extinguishing housing.

SUMMARY OF THE INVENTION

Accordingly, it is an object of the present invention to provide an improved dynamoelectric machine having a heat-dissipating, uninflammable, electro-insulative housing in which stator coil windings and a core are rigidly and voidlessly molded within a new resin-filler composition system.

It is another object of the present invention to provide an improved uninflammable dynamoelectric machine having a housing for encapsulating stator coil windings and a core, the housing being made of a cured article or material formed of a new resin-filler composition, molding characteristics of which are optimized for the housing of the stators.

It is still another object of the present invention to provide an improved dynamoelectric machine having an electro-insulative, uninflammable housing with improved electric properties.

According to the present invention there is provided an uninflammable dynamoelectric machine having a new heat dissipating, electro-insulative housing made of a cured resin-filler composition comprising:

(I) a liquid unsaturated polyester resin containing an ethylenically unsaturated compound and a curing catalyst; and (II) an inorganic filler composition consisting essentially of (a) a finely divided calcium carbonate powder, which passes a 325 mesh sieve, (b) an inorganic mineral particulate, at least 95% of which passes a 12 mesh sieve and is retained on a 200 mesh sieve.

(c) a glass fiber of a length larger than 200 μm and of a diameter less than 150 μm, and (III) an aluminum hydroxide powder which passes a 250 mesh sieve, wherein the ratios by weight of the respective components are as follows:

(a)/(b)=0.3 to 4, (c)/total weight of the composition=0.05 to 0.25 (I)/total weight of the composition=0.1 to 0.4, (II)/total weight of the composition=0.15 to 0.80, and (III)/total weight of the composition=0.1 to 0.6.

Other objects and features and advantages of the present invention will be apparent from the following detailed description when read in conjunction with the accompanying drawings, in which:

DETAILED DESCRIPTION OF THE INVENTION

(I) Unsaturated Polyester Resin

Figure 1:
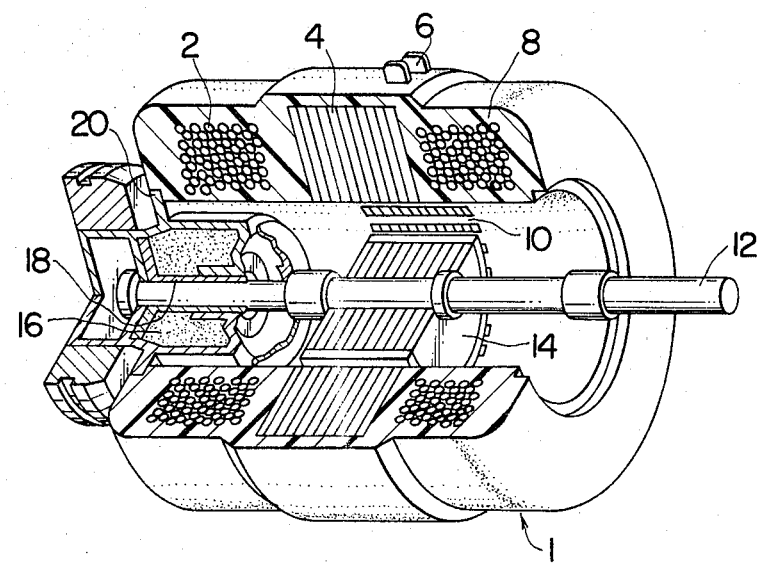
FIG. 1 is a perspective view, partially broken away, of a dynamoelectric machine according to the present invention.

In the present invention only unsaturated polyester resins are useful from the viewpoints of economy, molding characteristics, etc. The unsaturated polyester resins should contain an ethylenically unsaturated compound monomer such as styrene and a curing catalyst such as dicumyl peroxide. Examples of suitable unsaturated polyester resins are such as disclosed in the U.S. Pat. No. 3,562,201.

Among the conventional unsaturated polyester resins most preferable are reaction products obtained by reacting an epoxy compound of bisphenol A type or novolac type with methacrylic acid, acrylic acid, or a methacrylate or an acrylate ester. An example of suitable base resins is "DERAKANE 411-45" marketed by Dow Chemical Co.

They have a suitable viscosity i.e. about 50 to 50,000 centipoises at room temperature (25° C.) when admixed with about 30%–45% by weight of an ethylenically unsaturated compound monomer such as styrene. The ethylenically unsaturated monomers may be called a cross-linking agent for the unsaturated polyester resin. The unsaturated polyester and ethylenically unsaturated monomers react with each other in the presence of a suitable curing catalyst when heated.

The unsaturated polyester resin employed in the present invention may include polycondensates or condensates synthesized from unsaturated or saturated polybasic acids and hydroxyl compounds in the presence or absence of a catalyst. When the term "unsaturated polyester resin" is used in the composition, it is used to mean a mixture comprising the condensates, an ethylenically unsaturated compound such as styrene and a curing catalyst such as benzoyl peroxide.

Typical unsaturated and saturated polybasic acids include maleic acid, maleic anhydride, fumaric acid, chloromaleic acid, dichloromaleic acid, methaconic acid, itaconic acid, adipic acid, sebacic acid, phthalic acid, phthalic anhydride, isophthalic acid, terephthalic acid, pyromellitic acid, Het acid, etc.

Hydroxyl compounds include diols such as ethylene glycol, diethylene glycol, triethylene glycol, polyethylene glycol, propylene glycol, dipropylene glycol, trimethylene glycol, tetramethylene glycol, hexamethylene glycol, 2,2-diethylpropane diol-1,3, neopentylglycol, bromoneopentyl glycol, bisphenol dioxyethyl ether, hydrogenated bisphenol A, 2,2-di(4-hydroxy propoxy phenyl) propane, ethylene oxide, propylene oxide, 3,3,3-trichloropropylene oxide, phenylglycidyl ether, arylglycidyl ether, etc. Such polybasic acids as having three or more carboxylic groups may be used in combination with the dibasic acids. Similarly, polyhydroxyl compounds having three or more hydroxyl groups may be used in combination with the glycols.

Various kinds of ethylenically unsaturated compound monomers are used to mix with the unsaturated polyester resins. For example, styrene, vinyl toluene, α-methyl styrene, divinyl benzene, diallylphthalate, chlorostyrene, dichlorostyrene, bromostyrene, dibromostyrene, diallylbenzene phosphonate, diallyl-aryl phosphylate ester, triallylcyanurate, tribromophenol allylether, etc. Among the unsaturated compound monomers preferable are vinyl monomers such as styrene from the economical point of view. The unsaturated monomer is generally admixed with the unsaturated polyester resin in an amount of 20 to 50% by weight of the total weight of the resulting mixture.

The viscosity of the mixture of the unsaturated polyester and unsaturated monomer play a very important role. When the viscosity is too large, flow properties of the resin-filler composition system will not be suitable for the injection or transfer molding of stators of the dynamoelectric machines so that small cavities and interstices of coil windings will not be sufficiently filled with the composition system. On the other hand, when the viscosity is too low, separation between the mixture and fillers may occur so that designed electric and mechanical properties of the dynamoelectric machines will not be obtained. From the above and other points of view, the mixture consisting of the resin and unsaturated monomer should have a viscosity less than 50,000 centipoises but higher than 50 centipoises at room temperature.

When the mixture has a viscosity which is too low, addition of a suitable agent for increasing the viscosity may be useful. Such agent is, for example, diallylphthalate prepolymers. Preferably, the mixture should have a viscosity not smaller than 500 centipoises at room temperature.

According to the study of the composition it was found that a suitable amount of a diallylphthalate prepolymer was useful for adjusting the viscosity of the composition. When the viscosity of an unsaturated polyester resin used in a composition is too low, the separation between the resin and fillers is excessive, whereby mechanical and electrical properties of cured articles are not satisfactory. An additive amount of the diallylphthalate prepolymer is within a range of from 0.5 to 5% by weight based on the total weight of the composition. When the amount exceeds 5%, crack resistance of the cured articles is lowered. On the other hand, if the amount is less than 0.5%, an effect of the prepolymer is not expected. The prepolymer includes oligomers and prepolymers.

Curing catalysts for the mixture include, such as, benzoyl peroxide, parachloro benzylperoxide, 2,4-dichlorobenzoyl peroxide, capryl peroxide, lauroyl peroxide, acetyl peroxide, methylethylketone peroxide, cyclohexanone peroxide, bis (1-hydroxy cyclohexyl) peroxide, hydroxyheptyl peroxide, t-butylhydroxy peroxide, p-menthanehydro peroxide, cumenhydro peroxide, 2,5-dimethylhexyl 1-2,5-dihydro peroxide, di-tert-butyl peroxide, dicumyl peroxide, 2,5-dimethyl-2,5-di(t-butyl peroxide) hexane, 2,5-dimethylhexyl-2,5-di(peroxybenzoate), t-butylperbenzoate, t-butylperacetate, t-butylperoctylate, t-butylperoxyl butylate, di-t-butyl-diperphthalate, 1,1,-bis(t-butylperoxy)-3,3,5-trimethylcyclohexane, etc. The catalyst may preferably be added in an amount of 0.2 to 0.6% by weight per total weight of the composition.

In addition to the curing catalysts, conventional accelerators may be added to the mixture. There are various accelerators such as lauryl mercaptan, N-bytyl sulfite, diphenyl sulfite, p-toluene sulfonate, quaternary ammonium salts, β-diketones, peracetate type epoxy compounds, sulfonium salts, sulfuric acid anhydride, hydrogen sulfide, manganese naphtholate, vanadyl octoate, copper naphtholate, calcium naphtholate, metal chelates, amine compound, and other phosphor-containing compounds, or sulfur-containing compounds.

Further, a suitable polymerization inhibitor may be added in order to prolong the pot life or shelf life of the resin-filler composition system. The polymerization inhibitors include p-benzophenone, naphthoquinone, phenanthraquinone, paraxyloquinone, 2,5-diphenyl-p-benzoquinone, 2,5-diacetoxy-p-benzoquinone, hydroquinone, p-t-butylcatecole, 2,5-di-ti-butylhydroquinone, mono-t-butylhydroquinine, di-t-butylparacresole, hydroquinone monomethylether, alphanaphthole, acetoamizine acetate, acetoamizine sulfate, hydrogen chloride salts of phenylhydrazine, etc.

(II) Filler (a) Calcium carbonate powder

Calcium carbonate powder, which is chemically inert to the unsaturated polyester resins, includes pure calcium carbonate and other particulates whose main composition is calcium carbonate. The latter includes powders of calcium carbonate ores, i.e. limestone. The calcium carbonate powder should have a particle size not larger than 44 $\mu$m, preferably less than 20 $\mu$m. In other words 100% of calcium carbonate powder passes a 325 mesh sieve. In the specification, "Mesh" designates the U.S. mesh number. The calcium carbonate powder plays a very important role in the resin-composition system. According to investigations by the present inventors, it has been revealed that conventional typical fine fillers such as a finely divided quartz glass powder were not proper for the molding of stators of the dynamoelectric machines. When a quartz glass powder is used, it was found that glass fibers were finely ground and shortened during kneading the composition so that the function of the glass fibers for reinforcement of a cured article was substantially lost. On the contrary, when the calcium carbonate powder was used, the desired function of the glass fiber was maintained after kneading the composition.

The calcium carbonate powder is prepared by a known process which comprises selecting or dressing a limestone ore to remove other components than limestone, washing the dressed limestone with water, roughly grinding the limestone, grinding, sieving the resulting divided limestone to separate a fine limestone powder from a coarse limestone powder, finely grinding the fine limestone powder, and sieving the finely divided limestone powder to obtain a fine calcium carbonate powder, all of which passes a 325 mesh sieve.

A composition and properties of a typical calcium carbonate powder prepared by the above-mentioned process are as follows:

| | |
|---|---|
| $CaCO_3$ | 97.61 (% by weight) |
| $SiO_2$ | 0.2 |
| MgO | 0.26 |
| $R_2O_3$ (R is a metal atom) | 0.11 |
| Water | 0.3 |
| Organic substances | 2.05 |
| pH | 9.4 |
| Mean particle size | 2.22$\mu$ |
| Surface area | 10 $m^2$/g |
| Bulkiness | 90–100 cc/100 g |

The above-mentioned calcium powder has a sufficient quality for the composition for the dynamo-electric machine; however, if desired, a refined calcium carbonate powder such as a precipitated calcium carbonate powder may be used. A process for preparing the precipitated calcium carbonate is well known in the art, which comprises the following steps:

(1) Calcining a limestone ore to convert $CaCO_3$ to CaO,
(2) Selecting CaO,
(3) Adding water to CaO to form $Ca(OH)_2$,
(4) Refining the crude $Ca(OH)_2$,
(5) Blowing $CO_2$ gas into $Ca(OH)_2$ to form $CaCO_3$,
(6) Dehydrating and drying $CaCO_3$, and
(7) Grinding the dried $CaCO_3$ to obtain a pure, fine $CaCO_3$ powder.

Since the precipitated calcium carbonate powder is rather expensive, as compared with the powdered limestone, the finely divided limestone powder is more proper for the composition system of the present invention from the economical point of view.

The relatively coarse limestone powder, which is obtained by separation from the fine limestone powder as mentioned hereinabove is one of the suitable particulates as the coarse filler. This coarse limestone powder has almost the same composition as that of the fine calcium carbonate powder.

(b) Mineral particulate

The inorganic mineral particulate used as a coarse filler includes various kinds of powders such as mica powder, alumina powder, slate powder, silica powder, sand, etc. This mineral particulate should also be chemically inert to the unsaturated polyester resin. From the economical and other points of view, river sand, moutain sand, beach sand and limestone powder are suitable materials.

At least 95% of the mineral particulate should pass a 12 mesh sieve and be retained on a 200 mesh sieve so that the particle size thereof ranges between 74 μm and 1,400 μm. Preferably, it should pass a 12 mesh sieve and be retained on a 150 mesh sieve. The sieve number used in the specification is designated by the U.S. mesh number. Relations between the mesh numbers and particle sizes are as follows:

| | |
|---|---|
| 12 mesh | 1,410 μm |
| 32 mesh | 500 μm |
| 60 mesh | 250 μm |
| 100 mesh | 149 μm |
| 150 mesh | 105 μm |
| 200 mesh | 74 μm |
| 250 mesh | 63 μm |
| 325 mesh | 44 μm |

If the particle size of the mineral particulate exceeds 1,500 μm, the composition cannot flow into small cavities and interstices of the stators. On the other hand, if the particle size thereof is less than 70 μm, flow properties of the composition become poor due to an increase in viscosity of the composition. As a result, molding of the composition by means of an injection or transfer molding machine becomes difficult, and at the same time, mechanical properties, especially impact resistance of a cured article tends to be lowered.

River sand and mountain sand are commercially available in Japan as filler materials. River sand is classified into grades A-4, A-5, A-6 and A-7; mountain sand is classified into N-40, N-50, N-60 and N-80. It was found that the respective grades had the following particle size distributions.

TABLE 1

| Mesh | | River sand | | | | Mountain sand | | | |
|---|---|---|---|---|---|---|---|---|---|
| | | A-4 | A-5 | A-6 | A-7 | N-40 | N-50 | N-60 | N-80 |
| | +12 mesh | — | — | — | — | 2% | — | — | — |
| −12 mesh | +32 mesh | 95% | 32% | 95% | 15% | 80 | 4% | — | 3% |
| −32 mesh | +60 mesh | 5 | 66 | 4.5 | 33 | 13 | 67 | 30% | 20 |
| −60 mesh | +100 mesh | — | 2 | 0.5 | 39 | 4 | 15 | 44 | 33 |
| −100 mesh | +150 mesh | — | — | — | 9 | 1 | 3 | 17 | 23 |
| −150 mesh | +200 mesh | — | — | — | 2 | — | 1 | 7 | 17 |
| −200 mesh | +325 mesh | — | — | — | — | — | — | 2 | 4 |

By the term such as "−12 mesh+32 mesh" is meant that particles pass a 12 mesh sieve and are retained on a 32 mesh sieve.

The river sands of grades A-4, A-5, and A-6 and A-7 are useful for the present invention because they have all a particle size of about 1500 μm to 70 μm. Among these grades preferable are grades A-4, A-5 and A-6. Since grade A-7 contains 2% of particles having a particle size less than about 100 μm, it has a larger tendency to increase a viscosity of the composition than do other grades.

The mountain sands of grades N-40, N-50 and N-60 are preferable for the present invention because at least 91% of them has a particle size larger than 105 μm. Since the grade N-80 contains a considerable amount of particles which pass a 200 mesh sieve and a mean particle size thereof is considerably smaller than those of other grades, the grade N-80 is not necessarily useful for the present invention.

(c) Glass fibers

There are several kinds of glass fibers which have been conventionally used as a reinforcing filler for resin-filler composition systems. In the present invention, any kind of conventional glass fibers are useful. The length and diameter of the glass fibers are important factors in the present invention. A number of experiments by the present inventors have revealed that the glass fibers should have a length of at least 200 μm in the resin-filler composition system. Though the glass fibers are ground and shortened during kneading the composition, such short glass fibers as having a length of 200 μm will not be excessively shortened, provided that a suitable amount of calcium carbonate powder is present in the resin-filler composition system. Preferably, the glass fibers should have a length of from 1,000 μm to 100,000 μm, while the upper limit of the length is not, in fact, critical.

In Japan, glass fibers for use in fillers, which have a length of from 25,000 μm to 65,000 μm are available. As mentioned above, glass fibers are shortened during kneading. When the inventors measured the length of glass fibers in the kneaded composition, they found that the glass fibers had a length of from 200 μm to 5,000 μm while some glass fibers having a length outside the above range were found in the kneaded composition.

By employing the calcium carbonate powder and the coarse filler having specific particle size as mentioned above, it was possible to avoid the excess shortening of the glass fibers during kneading.

The glass fibers should have a diameter less than 150 μm. If the diameter is too large, flexibility thereof is insufficient so that glass fibers will be excessively shortened during kneading. Preferably, the glass fiber should have a diameter of 50 to several microns, i.e. 5 to 20 μm. Glass fibers having a diameter of from 9 μm to 13 μm are on the market in Japan. Waste glass fibers obtained as a waste in the step of spinning of glass fibers are also useful because they are inexpensive. Also, unwoven glass cloth may be used in the chopped form.

As a summary, the glass fibers should preferably have a length of 1,000 to 100,000 μm before they are added to the resin composition and they should preferably have a length of from 200 to 5,000 μm after the composition system has been subjected to kneading.

(III) Aluminum Hydroxide Powder

If rotation of a dynamoelectric machine is restrained, an excess electric current may flow through the windings to generate heat. It is an action of aluminum hydroxide in the present invention to release the water of crystallization in order to cool and prevent combustion before pyrolysis and combustion of the molded resin by the generated heat take place.

Other metal hydroxides such as magnesium hydroxide, etc., basic magnesium carbonate, and hydrates such as hydrated gypsum, diatomaceous earth, borax, etc. can release water by pyrolysis. But aluminum hydroxide is the best one among them in that water is not released at the curing temperature (about 150° C. in 5 minutes) of the resin-filler composition used in the present invention but water is released at a temperature of about 200° to 220° C., said temperature being below the pyrolysis temperature of the unsaturated polyester resin (about 240° C.) and the amount of released water is relatively large.

As aluminum hydroxide, a powder which passes a 250 mesh sieve (particle size of about 60 μm or less) is advantageously used.

Ratios of the Components

Ratios by weight of the respective components are important for accomplishing the purposes of the present invention.

1. Ratio (a)/(b) of the calcium carbonate powder to the mineral particulate should be within a range of from 0.3 to 4 by weight. If the ratio is larger than 4, an impact value of a cured article of the resin-filler composition is low. Observations of the state of the kneaded composition through microscope has revealed that when the ratio of the calcium carbonate powder to the mineral particulate is less than 0.3, glass fibers were ground and shortened during kneading the composition to loose its reinforcing function. On the other hand, if the ratio is larger than 4, the flow properties of the composition system were not good, and small cavities and interstices in a stator were not sufficiently filled therewith.

2. Ratio ([II]/total weight of the composition) of the weight of fillers to that of the total weight of the composition should be within a range of for example from 0.15 to 0.80. If the ratio is less than, for example 0.15, a mechanical strength and heat-dissipation property of a cured article or material formed from the composition system are not good. On the other hand, if the ratio exceeds, for example, 0.80, flow properties of the composition system will be poor. Therefore, such a composition is difficult for use in molding by a transfer or injection molding machine under low pressure (200 kg/cm² or less), because the composition system needs a high molding pressure so that the deformation of coil windings will occur. When clay powder is incorporated into the composition, the above-mentioned ratio ([II]/total weight of the composition) is shifted to a range of from 0.45 to 0.85. Ratio ([(a)+(b)]/total weight of the composition system) of the total of the calcium carbonate powder and mineral particulate to the total weight of the resin-filler composition system should be within a range of 0.10 to 0.55.

3. (Ratio ((C)/total weight of the composition system) of the glass fiber to the total weight of the resin-filler composition system should be within a range of from 0.05 to 0.25. If the ratio is less than 0.05 (i.e. 5%), a sufficient reinforcement by glass fibers is not expected. If the ratio exceeds 0.25 (i.e. 25%), flow properties of the composition system are not proper and the composition system becomes expensive. In order to obtain a cured article having an Izod impact value higher than about 2.5 kg.cm/cm², which is considered the minimum value required for the stator housing, at least 5% of glass fibers is necessary.

4. Ratio ([I]/total weight of the composition) of the polyester resin to the total weight of the resin-filler composition should be within a range of from 0.1 to 0.4 (i.e. 10 to 40%). When the ratio is smaller than 10%, adhesion of the particles of the fillers is not sufficient, and interstices between coil windings may remain unfilled with the composition. On the other hand, when the ratio is larger than 40%, the heat-dissipating characteristics of the housings made of a cured article are not good, and the coefficient of linear thermal expansion of the cured article is so large that cracks in the cured article occur and the separation between the cured article and metallic components of the stator may occur. Preferably, the ratio is within a range of from 0.15 to 0.3 so that the coefficient of linear thermal expansion of the cured article will be less than about $3 \times 10^{-5}$ cm/cm/°C., preferably $2 \times 10^{-5}$ cm/cm/°C., and that the mechanical properties, especially impact resistance, of the cured article are good.

5. Ratio ([III]/total weight of the composition) of the aluminum hydroxide powder to the total weight of the resin-filler composition should be within a range from 0.1 to 0.6. If the ratio is less than 0.1 (i.e. 10%), the unflammable property of the housing will become unsatisfactory. On the other hand, if the ratio is larger than 0.6 (i.e. 60%), the insulating properties of the housing will become unsatisfactory.

Other Additives

There are many kinds of additives, which have conventionally been used for molding compositions.

As is well known, short synthetic fibers such as acryl fibers, polyamide fibers, vinylon fibers may be incorporated into the resin-filler composition system.

Modifiers such as polybutadiene, polyethylene, polystyrene, phenol resin, epoxy resin, melamine resin, urea resins, etc. may be added to the composition system in an amount from 10 to 20% by weight per total weight of the composition. Further, a suitable separator such as calcium stearate, zinc stearate, stearic acid, polycrystalline wax, etc. is added to the composition system, preferably in an amount of 0.4 to 1.2% by weight per total weight of the composition. In order to improve wettability between the resin and filler, a suitable coupling agent such as vinylsilane, epoxysilane, aminosilane, etc. may be incorporated into the composition system, preferably in an amount of 0.2 to 1.0% by weight per total weight of the composition.

Various kinds of pigments such as titania, chromium oxide, carbon black, etc. may be added to the composition system, preferably in an amount of 0.2 to 2% by weight per total weight of the composition.

Various separation inhibitors such as clay powder which passes a 325 mesh sieve may be added to the composition.

Molding Process

Injection molding machines and processes therefor are known in the art. In order to avoid the deformation of coil windings of stators, an inner liner type injection transfer molding machine is preferably used in the present invention. A molding pressure less than 200 kg/cm$^2$, preferably 75 to 20 kg/cm$^2$ is used in the present invention. A molding temperature is preferably within a range of 120° to 180° C. and molding time is preferably 1 to 10 minutes.

DETAILED DESCRIPTION OF THE DRAWINGS AND EMBODIMENTS

FIG. 1 shows a perspective view, partially broken away, of a motor according to the present invention, in which coil windings 2 and core 4 are concentrically arranged around rotor 14. Coil windings 2 and core 4 are encapsulated with a cured article or material of a resin-filler composition system to form a heat-dissipating, electro-insulative housing 8. Slots 10 of the stator 1 each having a width of 5 mm are filled with the cured material. Accordingly, the stator components, including coil windings are also filled with the cured material. To the housing is fixed an end bracket 20 in which a bearing assembly 18 is provided. Shaft 12 of the rotor 14 is supported on the bearing assembly 18.

The present invention is illustrated by the following Examples in which all parts and percents are by weight unless otherwise specified.

EXAMPLE 1

In order to find the best combination of a fine filler with glass fibers, several experiments were carried out by the inventors.

Materials and compositions used in the experiments are as follows;
(1) Unsaturated polyester resin: A body of the unsaturated polyester resin is a mixture of 20% of a reaction product obtained by reacting DER-331 with methacrylic acid and 80% of a reaction product obtained by reacting DER-664 with methacrylic acid. (DER-331 and DER-664 are bisphenol A type epoxy resins.) The mixture contains 30% of styrene monomer based on the total weight of the mixture.
(2) Mineral particulate: River sand: A-4, A-5, A-6 or A-7.
(3) Fine filler materials;
  (i) Calcium carbonate powder: −325 mesh, a mean particle size is 2.22 μm.
  (ii) Quartz glass powder: −325 mesh, a mean particle size is 1.9 μm.
(4) Glass fiber: 6,000 μm in length and 9 μm in diameter.
(5) Aluminum hydroxide: −325 mesh, a mean particle size is 3.2 μm
(6) Separator: Zinc stearate (Zn-St).
(7) Coupling agent: Methacryloxy silane

| Compositions | (parts) |
|---|---|
| Unsaturated polyester resin (a mixture of the vinylesters) | 120 |
| Dicumyl peroxide | 1 |
| Methacryloxy silane | 1 |
| Zn—St | 1 |
| Silica Sand/Fine Filler | 58/192, 125/125 or 216/54 |
| Glass fibers | 50 |
| Al(OH)$_3$ | 120 |

Self-extinguishing characteristics of a cured article of the above-mentioned composition were measured with the result of extinguishing within 5 seconds from the ignition. Uninflammable property was measured according to UL-94. Test pieces were fired by a flame of gas burner and the amounts of time required for extinguishing the fire of the test pieces after the removal of the flame of gas burner were compared with the following criterions:

| Uninflammable property | Time required for extinguishment | | Melt drop during the combustion |
|---|---|---|---|
| | Average | Maximum | |
| V-0 | Within 5 sec. | Within 10 sec. | None |
| V-1 | Within 25 sec. | Within 30 sec. | None |
| V-2 | Within 25 sec. | Within 30 sec. | Yes |

In Table 2 below, there are shown the results of heat-cycle test in which compositions mentioned above were employed.

TABLE 2

| | | Sand/Fine Filler (ratio) | | | | |
|---|---|---|---|---|---|---|
| | | 0.3 | | 1.0 | | 4.0 | |
| | | Initial | After heat-cycles | Initial | After heat-cycles | Initial | After heat-cycles |
| A$_4$ | CaCO$_3$ | OOO | OOO | OOO | OXO | OOO | OXO |
| A$_5$ | | OOO | OOO | OOO | OOO | OOX | OOX |
| A$_6$ | | OOO | XOO | OOO | OOO | OOO | OXX |
| A$_7$ | | OOO | OXO | OOO | OOO | OXO | OXX |
| A$_5$ | Quartz glass | XXX | — | XXX | — | XXX | — |

Note
(1) Aluminum hydroxide: Al(OH)$_3$/total weight of the composition = 0.22
(2) Test conditions
Heat cycle: 130° C. × 2h ⇄ −20° C. × 2h
Number of heat cycle: 50 cycles
O: No crack, X: crack, —: not tested

EXAMPLE 2

Resin-filler compositions having the following compositions were prepared:

| | parts |
|---|---|
| Unsaturated polyester resin | |
| Unsaturated polyester resin body used in Example 1 | 60 |
| Styrene monomer | 30 |
| Diallylphthalate prepolymer | 5 |
| Dicumyl peroxide | 1 |
| Zn—St | 2 |
| Methacryloxy propyltrimethoxy silane | 1 |
| Filler | |

-continued

| | | parts |
|---|---|---|
| (i) | Silica sand | |
| (ii) | Calcium carbonate (particle size less than 10 μm) | shown in Table 3 |
| (iii) | Glass fibers (5,000 μm in length, 6 μm in diameter) | 60 |
| (iv) | Aluminum hydroxide (−250 mesh) | 65 |

5 test pieces of the respective compositions shown in Table 3 were molded by means of an inner linear type injection molding machine, and alternate current breakdown voltage (an incremental rate of voltage is 1 kv/sec.) of the test pieces were measured, and the results are shown in Table 3.

TABLE 3

| Silica sand (μm) | Impulse Breakdown Voltage (kV) Calcium carbonate/Silica sand (by weight) | | | | | |
|---|---|---|---|---|---|---|
| | 0/100 | 25/75 | 50/50 | 75/25 | 90/10 | 100/0 |
| −12 mesh +32 mesh | molding impossible | 7 | 13 | 13 | 8 | <4 |
| −32 mesh +60 mesh | molding impossible | 9 | 12 | 10 | 9 | <4 |
| −60 mesh +150 mesh | <4 | 9 | 13 | 10 | 9 | <4 |
| −100 mesh +250 mesh | 7 | 8 | 10 | 8 | 6 | <4 |

Note:
Calcium carbonate + Silica sand = 100

From the results shown in Table 3, it may be said that when silica sand has a small particle size such as −100 mesh +250 mesh and the ratio of calcium carbonate to the fine silica sand is outside of the range of 0.3 to 4, impulse breakdown voltages of the cured articles are not always good. It is also apparent that calcium carbonate and silica sand are essential for the composition to obtain a cured article with good electrical properties.

Uninflammable property of the cured article mentioned above were V-O according to the test under UL-94 as described in Example 1.

EXAMPLE 3

(1) Unsaturated polyester resin: That obtained by reacting DER-331 with DER-664.
(2) Mineral particulate: River sand: A-4
(3) Fine filler material: Calcium carbonate powder, −325 mesh, a mean particle size is 2.22 μm.
(4) Glass fiber: 5000 μm in length and 9 μm in diameter.
(5) Aluminum hydroxide: −325 mesh, a mean particle size is 3.2μ.
(6) Catalyst: 1,1-bis-(tert-Butyl peroxy)-3,3,5-trimethylcyclohexane.
(7) Separator: Zinc stearate (Zn-St)
(8) Coupling agent: Methacryloxy propyltrimethoxy silane.

| Compositions | (parts) |
|---|---|
| Unsaturated polyester resin | 100 |
| Catalyst | 1 |
| Separator | 1 |
| Coupling agent | 1 |
| Glass fiber | 50 |
| Calcium carbonate | 115 |
| Aluminum hydroxide + River sand A-4 | 260 |
| Aluminum hydroxide/ | |

| Compositions | (parts) |
|---|---|
| (total weight of the composition): | See Table 4. |

The above-mentioned compositions were kneaded at room temperature and cured at 130° C. to give test pieces of 1 mm thick. Uninflammable property was tested according to UL-94. The results are as shown in Table 4.

TABLE 4

| Particle size of Al(OH)₃ (μ) | Proportion of Al(OH)₃ | | | | | |
|---|---|---|---|---|---|---|
| | 0.51 | 0.40 | 0.25 | 0.16 | 0.09 | 0 |
| 80 | V-0 | V-0 | V-0 | V-1 | V-2 NG | V-2 NG |
| 60 | " | " | " | " | " | " |
| 17 | " | " | " | V-0 | " | " |
| 3.5 | " | " | " | " | " | " |
| 1.0 | " | " | " | " | " | " |

As shown in Table 4, if the proportion of aluminum hydroxide is 0.20 or more (i.e. 20% or more), uninflammable property of V-O can be guaranteed.

Figure 2:
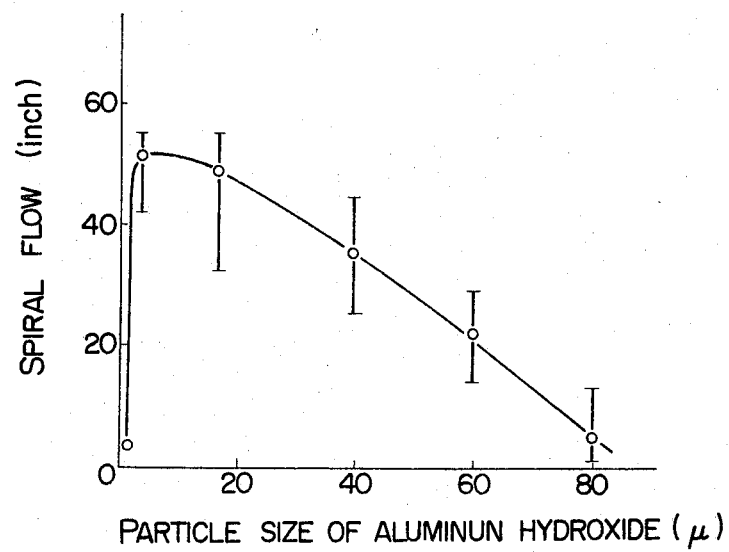
FIG. 2 is a graph showing relationship between flow properties of the resin-filler composition and particle size of aluminum hydroxide.

Relationship between particle size of aluminum hydroxide and flow properties of the resin-filler composition is shown in FIG. 2. Measurements were carried out according to the SPI-EMMI standard, that is, there were compared amounts of the resins flowed out through a nozzle having an inlet diameter of about 7 mm and an outlet diameter of 3 mm with a length therebetween of 10 mm when individual resins were pressed at a molding temperature of 130° C. under molding pressure of 50 kg/cm² and 2 minutes.

There are differences in flow properties (spiral flow) depending on the proportions of aluminum hydroxide, but relationship between the particle size and the flow properties is almost constant. Taking the utility into consideration, aluminum hydroxide having a particle size of 60 μm or less (passing 325 mesh sieve) is advantageous.

In the next place, stator assemblies of a 80 watt (100 V) dynamoelectric machines were injection molded by using the resin-filler compositions in which the proportion of aluminum hydroxide which passed a 325 mesh sieve was changed as shown in Table 5 but the total weight of aluminum hydroxide plus River sand A-4 was not changed. Properties of the resulting dynamoelectric machines are as shown in Table 5. As is clear from Table 5, the proportion of aluminum hydroxide 0.60 or less is preferable. If the proportion is more than 0.60, there is a tendency to give unpreferable effects on other properties.

TABLE 5

|  | Proportion of Al(OH)₃ | | | |
| --- | --- | --- | --- | --- |
|  | 0.61 | 0.51 | 0.40 | 0.25 |
| Filling property into coil slots | X | Δ | O | O |
| Deformation of coils by molding | X | O | O | O |
| Difficulty in generating cracks | X | Δ | O | O |
| Unflammable property | O | O | O | O |
| BDV (among coils) | X | O | O | O |
| Electric insulation (under absorption of moisture) | X | Δ | O | O |
| Overall evaluation | X | O | O | O |

Note
O: Excellent
Δ: Slightly inferior
X: Inferior

EXAMPLE 4

To a base resin containing 80 parts of terephthalic acid series unsaturated polyester resin and 20 parts of saturated polyester resin, 1 part of dicumyl peroxide as a curing catalyst, 2 parts of zinc stearate as a separator, 1 part of a silane series coupling agent, and 50 parts of glass fiber (chopped strand of 6 mm long) were compounded, and further 160 parts of aluminum hydroxide having an average particle size of 3.5μ as an inorganic filler (the proportion being 0.3), 80 parts of heavy calcium carbonate having an average particle size of 2.2μ and 135 parts of silica sand having an average particle size of 600μ were compounded and the resulting mixture was kneaded at room temperature. Using the thus obtained resin-filler composition, stator coil windings for 80 watt (100 V) were injection molded.

Figure 3:
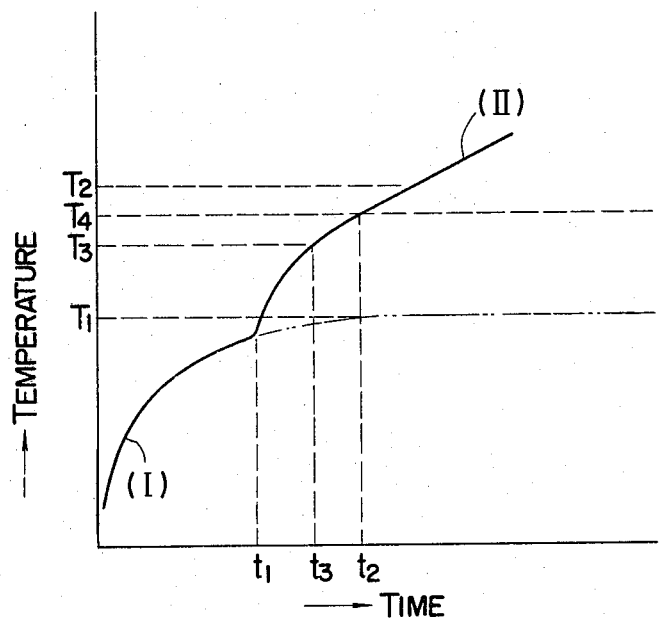
FIG. 3 is a graph showing a temperature change of stator coil windings when the rotation of dynamoelectric machine is restrained.

In FIG. 3, the curve (I) shows temperature property under normal operation of a dynamoelectric machine, wherein the temperature of the molded resin increases with the lapse of time and an equilibrium state is obtained at a certain temperature $T_1$. Under such conditions, if the rotor of dynamoelectric machine is restrained by any cause (at $t_1$ hours later from the beginning of the operation), the temperature of dynamoelectric machine rises rapidly as shown in the curve (II) due to a large quantity of bound electric current passing through stator coil windings 2 of the dynamoelectric machine.

If the restraint is continued and the temperature of dynamoelectric machine exceeds a certain temperature (about 240° C.), the organic insulating materials and the molded resin are pyrolyzed to generate combustible gases, which are burnt by catching fire by sparks caused by short-circuit between layers or fusing; this is a mechanism of the production of motor fire. In order to prevent a motor fire, it is necessary to inhibit the ignition of the combustible gases until fusing of the coils. That is, if a combustible gas generating temperature is $T_2$, and a temperature at which water of crystallization of aluminum hydroxide compounded in the molded resin is released is $T_4$, $T_2$ should be higher than $T_4$, $T_4<T_2$. Needless to say, $T_4$ should not be lower than normal operation temperature, $T_1$.

It was confirmed by experiments that while water of crystallization of aluminum hydroxide released by decomposition with heat inhibited the ignition of the combustible gases, the coils were fused and the supply of electricity was stopped so as to inhibit the production of fire of the dynamoelectric machine. The results are as shown in Table 6.

If the power supply is cut between a time when restraint of the dynamoelectric machine begins ($t_1$) and a time when water of crystallization of aluminum hydroxide begins to be released ($t_2$), the coils of dynamoelectric machine can be used repeatedly without being damaged by the fire.

TABLE 6

| | Resin-filler composition (parts) | | | | Combustibility | |
| --- | --- | --- | --- | --- | --- | --- |
| Run No. | Resin | Al(OH)₃ | Silica sand | CaCO₃ | Glass fibers, etc. | Ignition | Catching fire by an outer flame |
| 1 | 100 | 0 | 190 | 185 | 57 | Yes | Yes |
| 2 | " | 320 (0.60) | 30 | 25 | " | No | No |
| 3 | " | 266 (0.50) | 59 | 50 | " | " | " |
| 4 | " | 213 (0.40) | 112 | " | " | " | " |
| 5 | " | 160 (0.30) | 130 | 85 | " | " | " |
| 6 | " | 105 (0.20) | 185 | " | " | " | Yes |
| 7 | " | 80 (0.15) | 205 | " | " | No* | " |
| 8 | " | 20 (0.04) | 255 | 100 | " | No* | " |

Note
In the parentheses: Al(OH)₃/(total weight of the composition)
Motor: A 80 watt induction motor (see FIG. 1)
Test conditions: The rotor was fixed so as not to be rotated. Application of 60 Hz, 120 V was continued until the coils were fused. It took about 20 to 40 minutes until fusing or ignition.
Ignition: Whether the production of motor fire took place or not.
Catching fire by an outer flame: Whether fire is caught or not by nearing an outer flame to the pyrolyzed gases.
No*: When locked under low voltage for a long time (60 Hz, 80 V, 340 minutes), it ignites.

EXAMPLE 5

Effects of changes in the proportion of aluminum hydroxide (to the total weight of the composition) on combustibility of gases produced by pyrolysis after curing of the unsaturated polyester resin compositions used in Example 1 were examined.

Figure 4:
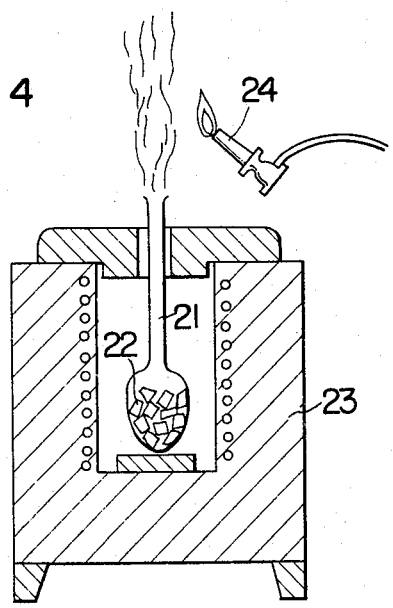
FIG. 4 is an outlined cross-sectional view of an experimental apparatus used for measuring ignitability and combustibility of the gas produced by pyrolysis of a cured article of the resin-filler composition.

In the compositions of Example 1, the proportion of aluminum hydroxide was changed to 0, 0.1, 0.2, 0.3, 0.4, and 0.5 and test pieces obtained by curing the compositions were heated and compared in combustibility using an apparatus as shown in FIG. 4. In FIG. 4, about 100 g of a test piece cut into chips (13×10×10 mm) 22 was placed in a flask 21 made of heat resistant glass and heated to about 500° C. in an electric furnace 23. Pyrolyzed gases generated were led to the outside and a gas burner flame 24 was neared to the gases and combustibility was examined. The results are as shown in FIG. 5.

Figure 5:
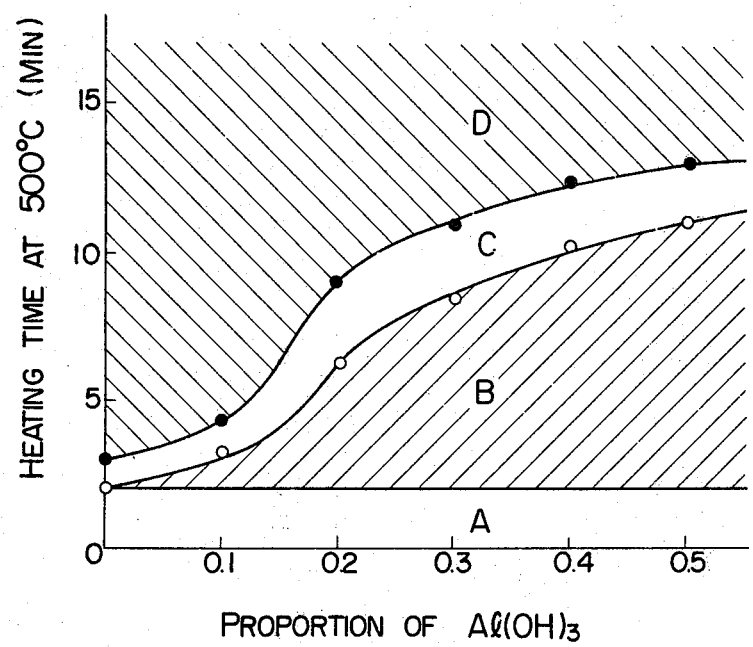
FIG. 5 is a graph showing relationship between ignitability or combustibility at 500° C. of the gas produced by pyrolysis of a cured article of the resin-filler composition and the proportion of aluminum hydroxide in the cured article of the resin-filler composition.

In FIG. 5, A shows an area where no pyrolyzed gases are produced, B shows an area where the pyrolyzed gases are produced but do not catch fire, C shows an area where the pyrolyzed gases instantaneously catch fire but continuous combustion does not take place, and D shows an area where continuous combustion takes place. As is clear from FIG. 5, inhibition effect of the combustion becomes greater when the proportion of aluminum hydroxide is more than 0.20.

What we claim is:

1. A dynamoelectric machine comprising a stator assembly including coil windings and a core encapsulated with a heat-dissipating, electro-insulative housing, a rotor assembly including a shaft centrally disposed thereto, and a bearing assembly disposed to the stator assembly, for rotatably supporting the shaft, wherein the housing is made of a cured resin-filler composition comprising:

(I) a liquid unsaturated polyester resin containing an ethylenically unsaturated compound monomer and a curing catalyst, which has a viscosity of from 50 to 50,000 centipoises at 25° C.; and (II) an inorganic, electro-insulative filler consisting essentially of
 (a) a calcium carbonate powder having a particle size corresponding to that of particles which can pass a 325 mesh sieve,
 (b) an inorganic mineral particulate having a particle size corresponding to that of particles which can pass a 12 mesh sieve and is retained on a 200 mesh sieve,
 (c) a chopped glass fiber having a length larger than 200 μm and a diameter less than 150 μm after the composition has been kneaded, and (III) an aluminum hydroxide powder which passes a 250 mesh sieve, wherein the ratios by weight of the respective ingredients are as follows:

(a)/(b)=0.3 to 4, (c)/total weight of the composition=0.05 to 0.25, and ((a)+(b))/total weight of the composition=0.1 to 0.5, (I)/total weight of the composition=0.1 to 0.4, and III/total weight of the composition=0.2 to 0.6, whereby said aluminum hydroxide powder acts to cool said resin and inhibit pyrolysis and combustion of said resin by releasing water of crystallization contained in the aluminum hydroxide powder when the cured resin-filler composition is heated excessively.

2. A dynamoelectric machine according to claim 1, wherein the mineral particulate is silica sand.

3. A dynamoelectric machine according to claim 1, wherein the length of the glass fibers is within a range of 200 to 5,000 μm after the resin filler composition system has thoroughly been kneaded.

4. A dynamoelectric machine according to claim 1, wherein the unsaturated polyester resin comprises a mixture of vinyl esters of a bisphenol A type epoxy compound or a novolac type epoxy compound with dimethacrylate or acrylate.

5. A dynamoelectric machine comprising a stator assembly including coil windings and a core encapsulated with a heat-dissipating, electro-insulative housing, a rotor assembly including a shaft centrally disposed thereto, and a bearing assembly, disposed to the stator assembly, for rotatably supporting the shaft, in which interstices between the coil windings and cavities are rigidly and voidlessly filled with a cured article and the outer surface of the housing is exposed to the atmosphere so as to dissipate heat generated by operation of the dynamoelectric machine, wherein the cured article has a coefficient of linear thermal expansion less than $3\times10^{-5}$ cm/cm/°C. and is made of a resin-filler composition comprising:

(I) a liquid unsaturated polyester resin composition containing an ethylenically unsaturated compound monomer and a curing catalyst, which has a viscosity of from 50,000 to 50 centipoises at 25° C.;

(II) an inorganic, electro-insulative filler consisting essentially of,
 (a) a calcium carbonate powder which passes a 325 mesh sieve,
 (b) an inorganic mineral particulate, at least 95% of which passes a 12 mesh sieve and is retained on a 200 mesh sieve, and
 (c) a glass fiber having a length larger than 200 μm and a diameter less than 150 μm; and (III) an aluminum hydroxide powder which passes a 250 mesh sieve, wherein the ratios by weight of the respective ingredients are as follows:

(a)/(b)=0.3 to 4, (c)/total weight of the composition system=0.05 to 0.25, and ((a)+(b))/total weight of the composition=0.1 to 0.5, (I)/total weight of the composition system=0.1 to 0.4, and (III)/total weight of the composition system=0.2 to 0.4, whereby said aluminum hydroxide powder acts to cool said resin and inhibit pyrolysis and combustion of said resin by releasing water of crystallization contained in the aluminum hydroxide powder when the cured resin-filler composition is heated excessively.

6. A dynamoelectric machine according to claim 5, wherein the calcium carbonate powder is a finely divided powder of limestone.

7. A dynamoelectric machine according to claim 5, wherein the mineral particulate is a silica sand powder which passes a 12 mesh sieve and is retained on a 150 mesh sieve.

8. A dynamoelectric machine according to claim 5, wherein the mineral particulate is a member selected from the group consisting of river sand, mountain sand, beach sand, limestone powder and combinations thereof.

9. A dynamoelectric machine according to claim 5, wherein the filler consists essentially of,
 (a) a calcium carbonate powder having a mean particle size less than 5 μm,
 (b) a mineral particulate, at least 95% of which passes a 12 mesh sieve and is retained on a 150 mesh sieve, the particulate being a member selected from the group consisting of river sand, mountain sand, beach sand, limestone powder and combinations thereof, and
 (c) a chopped glass fiber having a length of from 200 to 50,000 μm, and a diameter of 5 to 20 μm.

10. A dynamoelectric machine according to claim 1, wherein the unsaturated compound monomer is styrene.

11. A dynamoelectric machine according to claim 10, wherein the curing catalyst is dicumyl peroxide.

12. A dynamoelectric machine according to claim 1, wherein the unsaturated compound monomer is contained in an amount of 20% to 50% by weight of the total weight of the monomer and unsaturated polyester resin.

13. A dynamoelectric machine according to claim 1, wherein the calcium carbonate powder has a particle size less than 20 μm.

14. A dynamoelectric machine according to claim 1, wherein the glass fibers have a diameter of from 5 to 20 μm.

* * * * *